UNITED STATES PATENT OFFICE.

GUSTAV BISCHOF, OF LONDON, ENGLAND.

MANUFACTURE OF WHITE LEAD.

SPECIFICATION forming part of Letters Patent No. 442,943, dated December 16, 1890.

Application filed August 12, 1890. Serial No. 361,806. (No model.)

*To all whom it may concern:*

Be it known that I, GUSTAV BISCHOF, a citizen of England, residing at 4 Hart Street, Bloomsbury, London, in the county of London, England, have invented a new and useful Process for Manufacture of White Lead, of which the following is a specification.

In manufacturing white lead by acting with carbon dioxide on a lead oxide in the presence of suitable reagents, such as acetic acid or its compounds, great difficulty is experienced in obtaining for this purpose an oxide such as will produce white lead of a clear white color. One cause of this difficulty seems to be that lead oxides of commerce—such, for instance, as litharge—are mixtures of several compounds of lead with oxygen, which are differently acted on by the reagents employed, so that some of these oxides become converted before others of them, and when the reaction is continued in order to convert those others, those first converted are apt to be rendered crystalline, thus greatly impairing the value of the product.

My invention relates to a process whereby I can overcome the difficulty above stated, and can obtain from ordinary mixed lead oxides a clear uniform white lead without crystals in the following manner: I first partially deoxidize the crude lead oxides by exposing them at a temperature of 250° to 300° centigrade to the action of gas rich in hydrogen, such for instance, as water-gas. This operation may be conducted in revolving vessels or in stationary vessels provided with agitators and with suitable worms or other conveyers for delivering the partially deoxidized product, which is thus reduced to the condition of suboxide of lead ($Pb_2O$.) As it is of advantage to cool the product before it leaves the deoxidizing atmosphere, the delivery passage or passages should be water-jacketed or otherwise kept cool. Having thus reduced the material to the uniform condition of suboxide, I moisten this suboxide with water and expose it to the air, which has the effect of converting it into a higher oxide. Finally I subject this oxide mixed with water, sugar, and acetic acid or an acetate—such as acetate of lead—to the action of carbon dioxide. The proportions of the charge may vary. Practically I find a suitable proportion to be: hydrated oxide, about nine hundred pounds; water, about two hundred and fifty gallons; commercial acetic acid, equivalent to about fourteen pounds of the pure chemical acid, (or the equivalent of this in lead acetate,) and sugar, about forty-five pounds. The liquid portion of the charge after the white lead is separated from it may be used with successive charges of the lead oxide. This operation is conveniently performed in revolving vessels, the gas, when it is pure, being admitted through a trunnion under a little pressure. When the carbon dioxide gas is mixed with air or other gases, it is of advantage to employ in rotation a series of carbonating-vessels with inlet through the one trunnion and outlet through the other, so that the surplus gas can be conducted from the one to the next in order until the whole of the carbon dioxide or nearly the whole is absorbed.

Having thus described the nature of this invention and the best means I know for carrying the same into practical effect, I claim—

The herein-described process for the manufacture of white lead from the mixed lead oxides of commerce, which consists in reducing these to the condition of suboxide, cooling the suboxide, then subjecting it mixed with water to the action of air, and finally subjecting the resulting product in admixture with water, sugar, and acetic acid or an acetate to the action of carbon dioxide.

In testimony whereof I have signed my name to this specification, in the presence of two subscribing witnesses, this 28th day of July, A. D. 1890.

GUSTAV BISCHOF.

Witnesses:
HAROLD IMRAY,
   *28 Southampton Buildings, London, W. C.*
JNO. P. M. MILLARD,
   *Clerk to Messrs. Abel & Imray, Consulting Engineers and Patent Agents, 28 Southampton Buildings, London, W. C.*